Patented Apr. 24, 1951

2,550,558

UNITED STATES PATENT OFFICE 2,550,558

SHORTENING COMPOSITION AND METHOD OF PREPARING THE SAME

Francis Frederick Hansen, Pittsburgh, Pa.

No Drawing. Application April 11, 1946,
Serial No. 661,352

12 Claims. (Cl. 99—118)

The present invention relates to a shortening composition for use in the baking art and an improved method of producing the same, and relates specifically to shortening and its preparation using lecithin as the base.

In accordance with the present invention, there are provided, as has been indicated above, certain improvements for shortening compositions for use in the baking industry, which compositions are characterized by improved creaming properties and resistance to oxidation, rancidity, and other deteriorating changes in properties.

The use of fatty acid esters of glycerine in shortening compositions is well known. In connection with such shortenings, it is customary to esterify fatty acids derived from vegetable oils or animal fats to form glycerides of such fatty acids, which glycerides are identified as mono-glycerides, di-glycerides, or tri-glycerides, depending upon whether one, two, or three molecules of the fatty acid have been reacted with the glycerine for substituting the fatty acid radical for one, two, or three hydroxyl groups of the glycerine; or the mono-glycerides may be produced by further glycerination of vegetable or animal tri-glycerides.

Shortening compositions as employed conventionally are composed usually of tri-glycerides which may have certain proportions of mono- and/or di-glycerides incorporated therein for rendering the tri-glyceride composition susceptible to creaming and for increasing the wetting properties of the tri-glycerides.

It is known in practice that the mono-glycerides or di-glycerides prepared from fatty acids obtained from vegetable oils or animal fats are open to definite disadvantages from the standpoint of their utility in the baking industry. Thus, these compounds are notably poor in keeping qualities, they being readily subject to deterioration through oxidation on exposure to air and moisture, and rapidly become rancid through the formation of such products of oxidation.

In accordance with the present invention, it is found that mono-glycerides and di-glycerides of superior creaming and keeping properties are formed through esterifying with glycerine the fatty acids which are obtained from the material known as lecithin, which material is widely distributed in nature and now is easily available on the market. The source of lecithin as now commercially obtained is in various vegetable seeds such as corn, cottonseed, soybeans, and the like, soybeans being the principal source. As a matter of fact, this material is produced in such quantities as to accumulate beyond present limited demands.

In accordance with the present invention, when commercial lecithin is converted into fatty acids, and these fatty acids esterified with glycerine, the resulting glycerides possess very unexpectedly advantageous properties as shortening constituents over corresponding glycerides obtained from fatty acids derived from vegetable oils or animal fats. The explanation of the highly superior results obtainable regularly in practice by the use of mono- and di-glycerides derived from fatty acids obtained from lecithin, the characteristics of which persist through the final esterification of the fatty acids produced from the lecithin.

In the production of lecithin from the above-indicated sources, such as from soybeans, for example, a petroleum hydrocarbon solvent, such as petroleum ether or hexane, is used for the extraction of the oil from soybeans which contain from 1.5 per cent to 3 per cent of phosphatides containing the lecithins employed for the present invention.

This solvent does not remove all of the naturally occurring phosphatides from the beans because the bean meal still contains approximately 1 per cent residual phosphatides. The use of a single solvent, though it does not remove all of the phosphatide, does produce a product which is relatively free from carbohydrates and various naturally occurring bitter substances. The solvent-extracted oil containing the dissolved phosphatides is agitated with water at a temperature of from about 75 deg. C. to 80 deg. C. in order to flocculate the phosphatide emulsion. This operation requires from about 45 to 60 minutes. The resulting flocculant emulsion is separated from the oil by centrifuging, and the separated phosphatides, consisting of an emulsion of phosphatides, oil, and water, then are vacuum distilled to remove the water and volatile odor and flavor substances. The product resulting from this vacuum distillation may or may not then be bleached with hydrogen peroxide or dibenzoyl peroxide to lighten the color of the finished product. This end product of vacuum distillation is a mixture of about 60 to 65 per cent phosphatides containing lecithin and 40 to 35 per cent soybean oil, or corn oil, or cottonseed oil, depending upon the particular vegetable seed used as the source of the lecithin.

It is to be understood that by the phosphatides described above is meant the mixture of lecithins and cephalins which is isolated from soybean or other vegetable seeds as crude phosphatides.

Commercial preparations of phosphatides, often referred to as vegetable lecithin, which vegetable lecithin actually is composed of mixtures of lecithin and cephalin, consist of a mixture of approximately 60 per cent phosphatides, 35 per cent to 40 per cent soybean oil, or other oil depending upon the seeds from which the commercial phosphatides have been obtained, and about 4 per cent to 6 per cent moisture. However, these crude phosphatides also contain various amounts of sterols, sterol esters, carbohydrates, glucosides, pigments, and many other minor lipid and non-lipid constituents.

The phosphatides referred to above may be considered as tri-glycerides in which one fatty acid radical has been replaced with phosphoric acid and chloine. The cephalin fraction of the phosphatides is similarly esterfied with colamine (hydroxyethylamine). Lecithins and cephalins occur together in soybean phosphatides in proportions of about 35 per cent lecithins and 65 per cent cephalins.

In accordance with the present invention, the lecithins and cephalins present as the above-mentioned phosphatides are separated from the vegetable oils, and are processed to produce the improved baking product having the advantageous properties noted above.

In accordance with the present invention, the crude phosphatides are heated until they flow freely, which is at approximately 150 deg. F. The resulting freely flowing phosphatides are poured slowly and with vigorous agitation into a large volume of acetone, which preferably is heated to about 80 deg. F. The vigorous stirring and agitation of the acetone during the addition of the phosphatides assures complete dispersion of the phosphatides in the acetone, without tendency of lumping. These crude phosphatides contain approximately sixty per cent lecithin and cephalin, the balance being vegetable oil corresponding to the seeds from which the phosphatides are derived.

In this acetone extraction the lecithin and cephalin are insoluble in the acetone whereas the associated vegetable oils are soluble therein. The agitation distributes the phosphatides (lecithin and cephalin) uniformly through the body of the acetone which is centrifuged to separate the lecithin and cephalin from the acetone, the vegetable oils remaining in solution in the acetone. The separated lecithin and cephalin are recovered, and preferably the acetone extraction is repeated in order to free the lecithin and cephalin from last traces of the vegetable oils.

The resulting recovered lecithin and cephalin, which are pale straw to almost white in color, are dissolved in petroleum ether, preferably after removal of all of the acetone by any suitable procedure, such as by centrifuging or distillation. The solution of the lecithin and cephalin in the petroleum ether is effected at about 100 deg. F. for facilitating solution in the petroleum ether.

The petroleum ether solution of the lecithin and cephalin is treated with hydrochloric acid in one of several procedures. Thus, hydrochloric acid gas, diluted with air, may be passed into the petroleum ether solution, with simultaneous addition of water to the petroleum ether with vigorous stirring so as to bring the petroleum ether solution into intimate contact with the hydrochloric acid gas and water, the hydrochloric acid gas being added to a concentration corresponding to from 1 normal to 0.5 normal hydrochloric acid. Or, instead of hydrochloric acid gas, there may be employed a dilute aqueous solution of hydrochloric acid of the indicated normality.

In either case, the action of the hydrochloric acid is to split off the choline and colamine groups from the lecithin and cephalin, these separated groups forming compounds that are readily hydrolyzable with the water either added to the petroleum ether during passage of the hydrochloric acid gas therein, or in the water present in the dilute hydrochloric acid solution when this is employed. In the presence of the water, the choline and colamine groups that have been split off and chloridized by the hydrochloric acid, hydrolyze readily to form water-soluble compounds, the lecithin-cephalin residues forming identical compounds that are soluble in the petroleum ether, which forms a separate layer in the aqueous medium present. These identical compounds resulting from the action of hydrochloric acid on lecithin and cephalin are referred to hereinafter, and identified, as lecithin phosphate.

The reactions taking place in the foregoing treatment may be expressed in the following manner, as will be pointed out hereinafter.

For lecithin, there may be assigned the following formula, generally expressed as

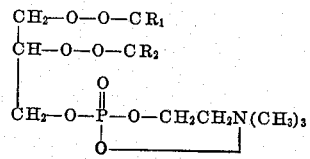

where $R_1$ and $R_2$ represent fatty acid radicals.

For cephalin, there may be assigned the following formula, generally expressed as

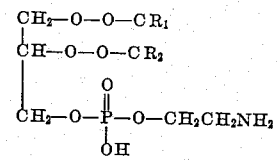

wherein $R_1$ and $R_2$ are fatty acid radicals.

From the foregoing, it will be seen, as has been pointed out above, that lecithin contains a choline group, and cephalin a colamine group. With dilute hydrochloric acid lecithin may be considered as reacting as indicated below:

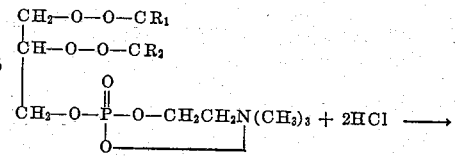

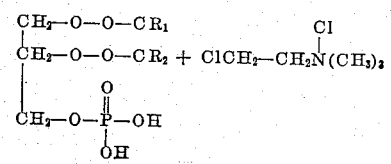

That is to say, the choline group becomes chloridized, and the lecithin converted into a phosphate compound, herein referred to as lecithin phosphate, containing the phosphate ($PO_4$) radical, which phosphate compound can be esterified with glycerine, for example, as described below.

The chloridized choline group compound may hydrolyze with water present in the dilute hydroglycerides are used in cakes, cookies, crackers, and all bakery products.

By creaming properties of the mono-glycerides referred to above is meant the following:

All mono- and di-glycerides of fatty acids contain one or more hydroxyl radicals, depending upon whether they are mono- or di-glycerides, contain one or more lipophile radicals and one or more hydroxyl radicals, depending upon whether they are mono- or di-glycerides. The lipophile radical comes from a fatty acid, whereas a hydroxyl radical comes from the glycerine and is hydrophilic. To have the highest creaming property, these two characteristics (lipophilic and hydrophilic) must be in proper balance. The term lipophilic signifies an affinity for all other fats, that is, lipids or lipoids, whereas hydrophilic signifies an affinity for water.

Therefore, when these mono-glycerides contact ordinary shortenings like lard or semi-fully hydrogenated vegetable shortenings, the lipophilic characteristic causes a quick union or mixture with the two substances, they having a great affinity for each other. After this complete and ready union of the different fats, one being a mono-glyceride or di-glyceride, and the other being a tri-glyceride, takes place, the hydrophilic characteristics of the mono- and/or di-glycerides cause a ready union with water, whereas tri-glycerides themselves repel or fight water and will absorb very little.

Now, when a mixture of about 10 per cent mono-glycerides and/or di-glycerides is mixed or beaten with water, the fats readily absorb or adsorb water, and the water becomes a definite part of the creamed mass, similar to egg white being beaten in air.

As mentioned above, mono-glycerides and/or di-glycerides produced from lecithins treated in the manner described above, when added to either vegetable or animal tri-glycerides, produce a marked improvement in the creaming effect, and through their improved or better lipophilic and hydrophilic properties, cause the creamed tri-glyceride to have more volume. The tri-glyceride holds more air and water than mono-glycerides or di-glycerides produced from any other fatty acids either from vegetable oils or animal fats. This improved creaming property is a great asset in the baking industry, for both all-yeast raised products as well as those made from baking powder, the more air that is trapped or entrained in the dough batch, the greater is the vapor pressure of the free water present in the dough batch, and it is a well established fact that the volume of baked products (commonly called oven-spring) is derived largely from conversion of free water into water vapor in the oven. There can be no vaporization of water without entrapped air; therefore, the more air trapped, the greater the vapor pressure of the free water in the dough batch, and the greater the absorption of water, the more free water is available for conversion into vapor.

Any possible way to increase water absorption and still be able properly to handle the product in the make-up equipment is desirable, because staling of baked products is associated with loss of moisture. Also, as previously stated above, the lightness and tenderness so desirable in baked products comes from improved oven-spring and volume, and the mono- and di-glycerides derived from lecithin treated in the above-described manner improves the lipophilic and hydrophilic characteristics of the shortening so that considerably more air and water are held in a dough batch or dough mix than normally is held by any other mono-glycerides or di-glycerides derived from fatty acids obtained from vegetable oils or animal fats.

The improved properties of the mono-glycerides and di-glycerides obtained from lecithin treated as above-described over those obtained from fatty acids derived from vegetable oils or animal fats, apparently are due, as above indicated, to materials that are associated with the lecithin especially as obtained from soybeans, corn, or other vegetable seeds, such materials including highly unsaturated acids containing from 20 to 22 carbon atoms. The properties of such materials apparently persist throughout the hydrochloric acid treatment and the glycerinating operation. Practice has demonstrated that the mono- and di-glycerides produced from lecithin treated as above-described are very markedly superior to those made from fatty acids obtained from vegetable or animal fats or oils, the mono- and di-glycerides from lecithin manifesting their superiority in unexpectedly high creaming properties and resistance against deterioration through rancidification, oxidation, or other changes resulting from the action of air and water.

In practice, the improved shortening of the present invention may be incorporated for use in a farinaceous base, such as cereal flour, for example wheat flour, or other farinaceous products, such as starch, potato flour, casava flour, or the like.

It will be understood from the foregoing that the term "lecithin" as employed in the appended claims is intended to include commercial lecithin, that is, the herein described phosphatides containing lecithin and cephalin, both of which are treated and recovered as described herein, and used together in the manner described herein.

By the term lecithin phosphate and similar terms employed herein and in the appended claims is meant the phosphate compound resulting from the reaction of hydrochloric acid on lecithin and cephalin resulting in the splitting off of the choline and colamine radicals, the said lecithin phosphate having the probable formula

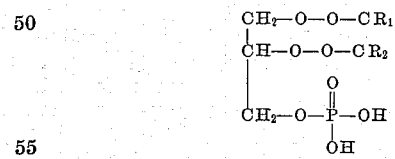

wherein $R_1$ and $R_2$ are different fatty acid radicals.

A modification of the above procedure is to treat the oil-freed lecithin-cephalin mixture obtained from the acetone extraction described above, directly with dilute hydrochloric acid instead of first dissolving the said oil-freed mixture in petroleum ether. For example, the mixture may be treated with from one to five parts by volume of dilute hydrochloric acid solution of 0.5N concentration, the solution being thoroughly agitated to mix the lecithin-cephalin mixture therewith. The resulting lecithin phosphate is insoluble in the dilute acid and is recoverable therefrom. The acid treatment may be repeated two or three times, the treatment being from fifteen to thirty minutes for each treatment.

The lecithin phosphate is separated, and chloric acid solution in accordance with the reaction

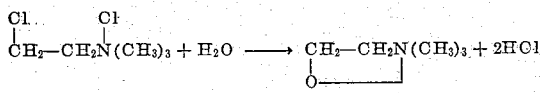

This resulting product, which is essentially choline, remains dissolved in the dilute hydrochloric acid solution while the "de-cholinized lecithin," which may be referred to hereinafter as "lecithin phosphate" remains in solution of petroleum ether.

Similar reactions occur with the cephalin present with the lecithin:

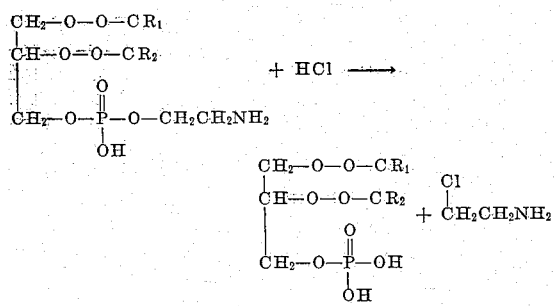

This chloridized colamine compound may hydrolyze with the water present in the dilute hydrochloric acid solution to precipitate an insoluble compound, thus

It will be seen that the phosphate compound formed by the reaction of cephalin with hydrochloric acid is identical with the phosphate compound produced by reaction of the lecithin with hydrochloric acid; in other words, "decolaminized cephalin" becomes the same as lecithin phosphate. Consequently, the petroleum ether solution contains only the lecithin phosphate, whereas the hydrolyzed water-soluble composition is a mixture of the choline and colamine compounds, which can be readily separated from the petroleum ether solution containing the lecithin phosphate.

The petroleum ether solution is separated from the aqueous constituent and is treated with a caustic soda solution of known concentration, for example, a tenth-normal solution, for neutralizing any free hydrochloric acid in the petroleum ether solution. The amount of tenth-normal sodium hydroxide required to neutralize any free hydrochloric acid is determined by titrating an aliquot part of the petroleum ether solution in hot alcohol with tenth-normal caustic soda. In this manner the amount of caustic soda solution required is determined.

The sodium chloride resulting from the neutralization is removed from the petroleum ether solution by washing through centrifugal separators, using water for the solvent. The centrifuged petroleum ether solution, now free from hydrolyzed choline and colamine compounds, and the sodium chloride formed from the nuetralization of the free hydrochloric acid, then is distilled to recover the petroleum ether, and the lecithin phosphate contained therein is recovered in comparatively pure form suitable for esterification.

The lecithin phosphate then is esterified with glycerine at a temperature of from 360 deg. F. to 400 deg. F. for about four hours in the presence of an inert gas, such as nitrogen or hydrogen. This action is promoted by the use of small amounts (0.05 to 0.1 per cent) sodium acid phosphate as a catalyst. The amount of glycerine employed for the reaction is controlled to produce whatever glycerol ester of lecithin is desired.

Of these glycerides, the mono-glycerides and di-glycerides, and particularly the former, that are obtained by esterifying the lecithin phosphate obtained as described above with glycerine, possess unique advantageous properties when employed in conjunction with shortening compositions for baking, which properties are wholly unexpected and are very different from the properties noted from comparable compounds made from fatty acids obtained from vegetable or animal fats or oils.

For instance, it has been noted in practice that the mono-glycerides and di-glycerides produced from lecithins treated as above have a very much higher creaming action on all tri-glycerides of fats, and possess much better keeping properties because of some property carried over from the lecithins which act as anti-oxidants. Mono- and di-glycerides produced from animal and vegetable oils or fats become easily rancid through oxidation, and their keeping properties are quite short; whereas mono-glycerides and di-glycerides made from lecithin treated as above resist rancidity for long periods of time.

As hereinbefore noted, the mono-glycerides and di-glycerides obtained from lecithin have unexpectedly higher creaming action on tri-glycerides of fats that are employed customarily in baking. This is shown by the following established standard creaming test:

Twenty grams of best leaf lard were creamed with two grams of lecithin-derived mono-glyceride prepared from lecithin treated as described above. Water was added slowly at a temperature of 80 deg. F., the creaming substances being kept at the same temperature, the mixture being stirred rapidly during the addition of water. The end point was established as being that point in cubic centimeters of water added until the lard plus mono-glyceride will not absorb or hold any more water. In the case of the lecithin-derived mono-glyceride, the amount of water before the end point was reached amounted to 290 cubic centimeters, whereas the highest results obtainable with mono-glycerides produced from the usual vegetable or animal fats or oils amounted to 185 cubic centimeters on the same test, an increase of more than 50 per cent.

This substantial difference in creaming power on fats is a great benefit in favor of the mono-glycerides obtained from lecithin in the manner described above herein, because mono-glycerides are used with shortenings primarily to improve their creaming power.

Since the mono-glycerides obtained from lecithin treated in the above-described manner have such greater creaming power on all fats than some mono-glycerides obtained from vegetable oils or animal fats or oils, a less amount need be used in commercial operations, or where comparable amounts are used, the results are much improved. The food produced in which these lecithin-derived mono-glycerides are used, retains its moisture longer, does not stale as readily, and the texture, crumb and the color of baked food products are much better. This is found to be true not only in the case of bread or yeast-raised products, wherein these mono-glycerides plus lard or other low melting shortenings are used, but the same increase in desirable results is obtained when these lecithin-derived monowashed to free it from adhering hydrochloric acid.

Over-treatment with hydrochloric acid is to be avoided, and excessively strong hydrochloric acid is detrimental, it being found that 1N hydrochloric acid is the maximum practicable concentration, 0.5N being preferred. If the treatment with hydrochloric acid is excessive, fatty acids will be split off from the lecithin phosphate molecule, which then undergoes an intermolecular rearrangement, the fatty acid radical  being replaced by an OH group, which finally is replaced by the

—O—O—CR$_2$ group, the replacing hydroxyl interchanging with the —O—O—CR$_2$ group to give a compound of the final constitution:

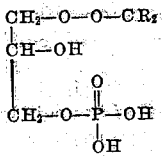

Further over-treatment results in the replacement of the —O—O—CR$_2$ group with hydroxyl. But none of these over-treated hydroxyl substituted compounds possesses the advantageous properties of the lecithin phosphate; and it is found in practice that the concentration of hydrochloric acid is critical, owing to the difficulty in controlling the reaction with higher concentrations of the acids, the more concentrated acid requiring shorter reaction times, hence increasing likelihood of over-treatment.

It is known that lecithin and cephalin contain a high percentage of fatty acids comprising palmitic acid, stearic acid, oleic acid, linoleic acid, linolenic acid and also highly unsaturated fatty acids, such as acids containing twenty and twenty-two carbon atoms, the exact constitution of the lecithin and cephalin being not exactly understood, and therefore, for simplicity, these fatty acids are designated simply as R$_1$ and R$_2$ in the above formulas for lecithin and cephalin, and for the compound identified as lecithin phosphate.

Also, there may be noted the fact that the petroleum ether extraction of the oil-freed lecithin and cephalin may be omitted, and that these compounds may be chloridized and hydrolyzed directly with dilute hydrochloric acid of the indicated percentages without going through the petroleum ether treatment.

Thus after the acetone extraction to remove the associated vegetable oils, as described above, the residual acetone is removed from the extracted mixture of lecithin and cephalin, and this now oil-free mixture is thoroughly dried in an oven at a temperature of about 100° F. The resulting dried mixture then is comminuted to 100 mesh or finer and introduced into a dilute hydrochloric acid solution as described above, and the resulting mixture is colloidized or homogenized under elevated pressures of the order of from 2000 to 3000 pounds of pressure.

The resulting reaction mixture in which the chloridized and hydrolyzed constituents remain in solution in the hydrochloric acid and the lecithin phosphate which is produced, is insoluble, then is treated as described above for the recovery of the lecithin phosphate.

In either case, the excess, or residual, hydrochloric acid in the lecithin phosphate may be washed out with water, instead of neutralizing with caustic soda, as described above.

It is found in practice, that the lecithin may be hydrolyzed and chloridized with one molecule of hydrochloric acid and two molecules of water instead of the two molecules of hydrochloric acid and one molecule of water, as described above, the reactions involved depending upon the concentration of the hydrochloric acid and the amount of water present. Thus, it may be stated that the lecithin will react with water and hydrochloric acid in the amounts of two molecules of water and one molecule of hydrochloric acid to give lecithin phosphate, and choline monochloride instead of choline dichloride as indicated previously as a product of hydrolysis, in accordance with the reaction:

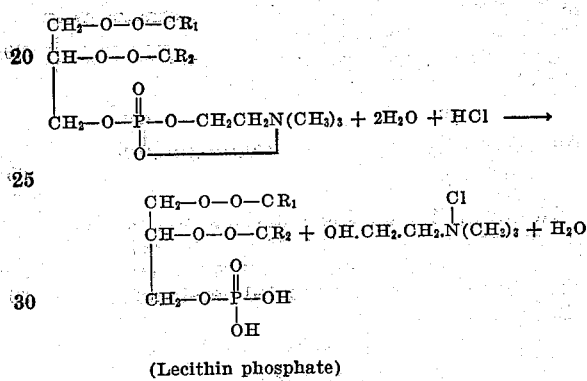

(Lecithin phosphate)

The lecithin phosphate is insoluble in water, and dilute hydrochloric acid, but is soluble in petroleum ether. The choline monochloride is soluble as such, or may hydrolyze with a molecule of water to replace the chlorine with hydroxyl, in accordance with the reaction:

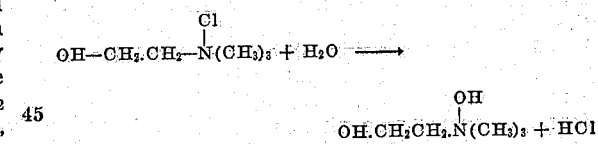

This choline compound also is soluble in water.

According to some authorities, the constitution of lecithin instead of having a ring configuration with an oxygen of the phosphate constituent linked with the nitrogen in the choline group, is indicated as having an hydroxyl group instead of the said oxygen and an hydroxyl group linked to the nitrogen. The chloridizing and hydrolyzing reaction would follow then, in accordance with the reaction:

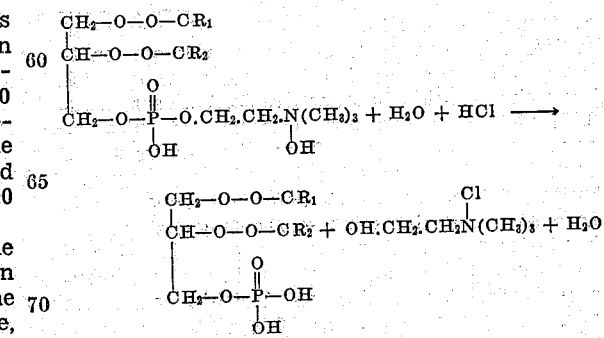

There is again formed the same compound, which is identified herein as lecithin phosphate.

In the case of cephalin, the reaction of chloridizing and hydrolyzing may be expressed, also as follows:

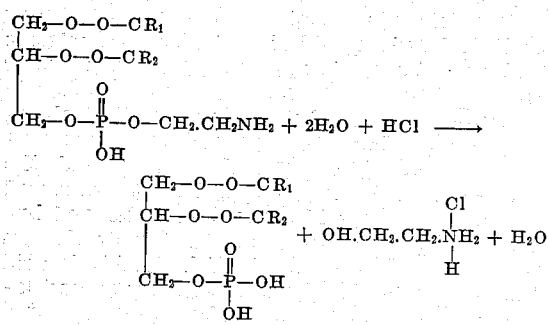

The colamine mono-chloride thus produced is soluble in water. The other product is the same lecithin phosphate obtained in accordance with the other reactions obtained above. The colamine mono-chloride may react with water to replace the chlorine with hydroxyl, thus

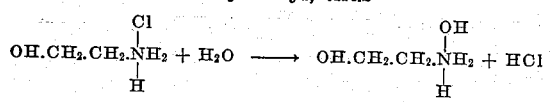

However, the specific reactions are, of themselves, not critical to the present invention, the important feature being the production of the phosphate compound identified herein as lecithin phosphate

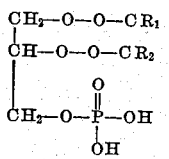

which is produced by the reaction of hydrochloric acid and water on lecithin and cephalin, quite regardess of the particular mechanisms of the remaining reactions. This lecithin phosphate is soluble in petroleum ether, but insoluble in water and hydrochloric acid solutions of the concentrations indicated. This lecithin phosphate is found, in accordance with the present invention, to have of itself desirable properties as a shortening constituent without glycerination of the phosphate.

In practice, the improved shortening composition of the invention may be incorporated for use in a farinaceous base, such as a cereal flour, such as wheat flour, for example, or other farinaceous products, such as starch, potato flour, cassava flour, or the like.

I claim:

1. The process of preparing a shortening composition for use in the baking industry, which comprises separating lecithin and associated cephalin from accompanying vegetable oil, reacting a solution of the lecithin and cephalin with hydrochloric acid of a concentration between about 0.5N and 1N, hydrolyzing choline and colamine constituents separated from the lecithin and cephalin by the hydrochloric acid, separating the hydrolyzed choline and colamine constituents from the remaining solution, reacting the remaining lecithin-derived compounds with glycerine in controlled amounts for producing a predetermined glyceride of the said lecithin compound and incorporating the resulting glyceride into a shortening composition for increasing creaming properties of the said composition and increasing resistance to deterioration through rancidification.

2. The process of producing a shortening composition for use in the baking industry which comprises separating lecithin and cephalin from accompanying vegetable oil, dissolving the separated lecithin and cephalin, reacting the resulting solution of the lecithin and cephalin with hydrochloric acid of a concentration between about 0.5N and 1N, hydrolyzing choline and colamine constituents separted from the lecithin and cephalin by the hydrochloric acid, neutralizing the remaining solution, reacting the remaining lecithin-derived compounds in controlled amounts for producing a predetermined glyceride of the said lecithin-derived compounds, and incorporating the resulting glyceride into a shortening composition for increasing creaming properties of the said composition and increasing resistance to deterioration through rancidification.

3. A shortening composition for use in baking, comprising a glyceride of lecithin phosphate incorporated in a tri-glyceride shortening, so that the resulting mixed shortening contains approximately ten per cent of the said lecithin phosphate.

4. The method of preparing a shortening material, which comprises converting vegetable phosphatides into lecithin phosphate by reaction with hydrochloric acid of a concentration between about 0.5N and 1N, producing a predetermined glyceride from the lecithin phosphate, and incorporating the resulting lecithin glyceride into conventional shortenings for increasing creaming properties thereof.

5. The method of preparing vegetable lecithin for use with shortening, which comprises extracting commercial lecithin containing cephalin and vegetable oil with acetone until the vegetable oil is dissolved in the acetone while leaving the lecithin and cephalin undissolved as a mixture thereof, recovering the resulting oil-free mixture of lecithin and cephalin, removing associated acetone therefrom, treating the said mixture with hydrochloric acid of the concentration between about 0.5N and 1N to split off choline and colamine from the lecithin and cephalin as hydrolyzable chlorine compounds thereof and to convert the lecithin and cephalin into water-insoluble lecithin phosphate, hydrolyzing the chlorine compounds of choline and colamine, separating the lecithin phosphate from the resulting hydrolyzed compounds and recovering the lecithin phosphate, and reacting the lecithin phosphate with glycerine.

6. The method of preparing crude phosphatides obtained from vegetable seeds and containing lecithin, cephalin and vegetable oils to adapt the same for use in a shortening compound, which method comprises introducing the crude phosphatides into a large excess of acetone, homogeneously distributing the crude phosphatides in the acetone, extracting the vegetable oils from the crude phosphatides in the acetone, recovering the resulting oil-free lecithin and cephalin from the acetone as a mixture of the lecithin and cephalin, treating the said mixture with hydrochloric acid of a concentration ranging between 0.5N and 1N in the presence of water thereby converting the lecithin phosphate while splitting off choline and colamine from the lecithin and cephalin as chlorine derivatives of choline and colamine, hydrolyzing the said chlorine derivatives in the water present with the hydrochloric acid while leaving the lecithin phosphate as a water-insoluble compound, recovering the said lecithin phosphate, and reacting the lecithin phosphate with glycerine, 7. The method of preparing crude phosphatides obtained from vegetable seeds and containing lecithin, cephalin and vegetable oils to adapt the same for use in a shortening compound, which method comprises heating the crude phosphatides until the phosphatides become freely flowing, introducing the freely flowing phosphatides into a large volume of acetone maintained at approximately 80 deg. F., vigorously mixing the crude phosphatides with the acetone until uniform dispersion thereof in the acetone is effected together with solution of the vegetable oils from the remaining mixture of lecithin and cephalin, recovering the said mixture of lecithin and cephalin from the acetone, removing residual acetone from the said mixture, dissolving the said mixture of lecithin and cephalin in petroleum ether, adding water to the resulting petroleum ether solution, emulsifying the petroleum ether solution in the water, adding hydrochloric acid of a concentration ranging between 0.5N and 1N to the said resulting emulsion, continuing agitation of the emulsion and addition of hydrochloric acid until concentration thereof reaches from approximately one-half normal to approximately one-normal thereby converting the lecithin and cephalin into lecithin phosphate that is soluble in the petroleum ether and splitting off choline and colamine from the lecithin and cephalin as water-soluble hydrolyzed compounds, separating the petroleum ether solution of lecithin phosphate from the water solution of the hydrolyzed compounds, neutralizing excess hydrochloric acid present in the lecithin phosphate, recovering the lecithin phosphate from the petroleum ether solution thereof, and reacting the lecithin phosphate with glycerine.

8. The method of preparing a material for use in a shortening composition for use in the baking industry, which comprises converting crude phosphatides obtained from vegetable seeds and containing lecithin and cephalin into substantially pure lecithin phosphate by reaction with hydrochloric acid of a concentration of between about 0.5N and 1N, esterifying the lecithin phosphate with glycerine, and incorporating the resulting glycerinated lecithin phosphate into a shortening composition.

9. The method of preparing a shortening composition which comprises reacting crude phosphatides comprising lecithin and cephalin with hydrochloric acid of a concentration ranging between about 0.5N and 1N to convert the lecithin and cephalin into lecithin phosphate, recovering the said lecithin phosphate in substantially pure condition, esterifying the said lecithin phosphate with glycerine and incorporating the resulting glycerinated lecithin phosphate into a shortening composition.

10. The method of preparing a phosphatide mixture comprising lecithin and cephalin for use in a shortening composition which consists in reacting the phosphatide mixture comprising lecithin and cephalin with hydrochloric acid of a concentration ranging between about 0.5N and 1N until the mixture of lecithin and cephalin is converted into lecithin phosphate, recovering the lecithin phosphate in substantially pure condition, and esterifying said lecithin phosphate with glycerine.

11. The method of preparing a shortening composition for use in the baking industry from commercial phosphatides comprising mixtures of lecithin and cephalin and vegetable oil, which comprises extracting the vegetable oil from the mixture of lecithin and cephalin, reacting on the mixture of lecithin and cephalin with hydrochloric acid of a concentration between about 0.5N and 1N and water until the lecithin and cephalin are converted into lecithin phosphate, removing excess hydrochloric acid from the lecithin phosphate recovering the lecithin phosphate, and esterifying the lecithin phosphate with glycerine, and thereafter incorporating the esterified lecithin phosphate with a conventional shortening until the resulting mix contains approximately 10% of the said esterified lecithin phosphate.

12. The method of preparing a shortening composition for use in the baking industry from commercial phosphatides comprising mixtures of lecithin and cephalin and vegetable oil, which comprises treating the mixture of lecithin and cephalin with acetone until all of the vegetable oil is extracted therefrom, removing residual acetone from the remaining mixture of lecithin and cephalin, introducing the mixture of lecithin and cephalin into a dilute aqueous solution of hydrochloric acid of a concentration between about 0.5N and 1N, subjecting the mixture of lecithin and cephalin and hydrochloric acid to elevated pressures of from approximately 2000 pounds to approximately 3000 pounds until the lecithin and cephalin have become converted into lecithin phosphate, separating the lecithin phosphate from the major portion of unreacted hydrochloric acid, freeing the lecithin phosphate from adhering hydrochloric acid, recovering the lecithin phosphate, and esterifying the lecithin phosphate with glycerine, and thereafter incorporating the esterified lecithin phosphate with a conventional shortening until the resulting mix contains approximately 10% of the said esterified lecithin phosphate.

FRANCIS FREDERICK HANSEN.

REFERENCES CITED

The following references are of record in the file of this patent:

UNITED STATES PATENTS

| Number | Name | Date |
| --- | --- | --- |
| 2,057,695 | Schwieger | Oct. 20, 1936 |
| 2,182,767 | Thurman | Dec. 5, 1939 |
| 2,201,063 | Thurman | May 14, 1940 |
| 2,271,127 | Mattikow | Jan. 27, 1942 |
| 2,276,316 | Kraybill et al. | Mar. 17, 1942 |
| 2,280,427 | Thurman | Apr. 21, 1942 |
| 2,310,679 | De Groote et al. | Feb. 9, 1943 |
| 2,332,074 | Griffith | Oct. 19, 1943 |
| 2,334,401 | Fitzpatrick et al. | Nov. 16, 1943 |
| 2,373,686 | Julian | Apr. 17, 1945 |